US009134424B2

(12) United States Patent
Kosolobov et al.

(10) Patent No.: US 9,134,424 B2
(45) Date of Patent: *Sep. 15, 2015

(54) METHOD AND SYSTEM FOR DETERMINING POSITION USING A SATELLITE SYSTEM

(75) Inventors: Andrei Kosolobov, San Jose, CA (US); David Albert Lundgren, Mill Valley, CA (US); Steven Malkos, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 714 days.

This patent is subject to a terminal disclaimer.

(21) Appl. No.: 13/313,171

(22) Filed: Dec. 7, 2011

(65) Prior Publication Data

US 2012/0075141 A1    Mar. 29, 2012

Related U.S. Application Data

(63) Continuation of application No. 12/394,253, filed on Feb. 27, 2009, now Pat. No. 8,081,107.

(51) Int. Cl.
*G01S 19/05*    (2010.01)
*G01S 19/12*    (2010.01)
*G01S 19/48*    (2010.01)

(52) U.S. Cl.
CPC ............... *G01S 19/05* (2013.01); *G01S 19/12* (2013.01); *G01S 19/48* (2013.01)

(58) Field of Classification Search
USPC ............. 342/357.21, 357.31, 357.46, 357.62, 342/357.63, 357.64; 701/468, 469
See application file for complete search history.

(56) References Cited

U.S. PATENT DOCUMENTS 5,724,660 A   3/1998  Kauser et al.
8,081,107 B2  12/2011 Kosolobov et al.

FOREIGN PATENT DOCUMENTS

WO   WO 2005/010549   2/2005
WO   WO 2007/056738   5/2007

OTHER PUBLICATIONS

EPO Communication dated Aug. 12, 2011 in Application No. 10001627.8-1248 (5 pages).
European Patent Office, Communication with European Search Report, dated Jun. 2, 2010, in EP Application No. 10001627.8.
Sprati, Michael, "An Overview of Positioning by Diffusion", Wireless Networks, vol. 9, No. 6, Nov. 30, 2003, pp. 565-574, XP040172196, U.S.A. DOI: http:/fdx.doi.org/10.1023/A:1025942800145.

*Primary Examiner* — Dao Phan
(74) *Attorney, Agent, or Firm* — Sterne, Kessler, Goldstein & Fox P.L.L.C.

(57) ABSTRACT

A GNSS enabled handset receives signals from different resources comprising GNSS satellites and/or from a wireless network. The GNSS enabled handset acquires location information comprising various positioning resource data comprising GPS data and/or WiFi data from the received signals. The GNSS enabled handset calculates a plurality of possible position fixes based on the acquired location information using various positioning approaches. A current position fix associated with the GNSS enabled handset is determined based on the plurality of calculated possible position fixes via running a location-based service (LBS) client on the GNSS enabled handset. The LBS client determines the plurality of possible position fixes using various positioning approaches in a particular or determined order. Confidence levels for each of the calculated plurality of possible positions are determined and used to refine the current position fix. The refined current position fix is used for a location-based service from a LBS application server.

23 Claims, 6 Drawing Sheets

METHOD AND SYSTEM FOR DETERMINING POSITION USING A SATELLITE SYSTEM

CROSS-REFERENCE TO RELATED APPLICATIONS/INCORPORATION BY REFERENCE

This patent application is a continuation of U.S. patent application Ser. No. 12/394,253 filed on Feb. 27, 2009.

FIELD OF THE INVENTION

Certain embodiments of the invention relate to signal processing for satellite navigation systems. More specifically, certain embodiments of the invention relate to a method and system for a location-based broker service (LBS) client broker.

BACKGROUND OF THE INVENTION

Mobile positioning service, also called location-based service (LBS), is a new type of value-added service provided by mobile communication networks. Knowing a user's location enables many new LBS applications. The market for location-based services (LBS) is potentially tremendous. Developing location approaches to determine a user's position fix at associated communication device such as a mobile phone has become the driving forces behind the LBS market. There are various location determination approaches such as, for example, path loss approach and/or triangulation approach. The various location determination approaches are utilized to calculate a position fix for a communication device such as a mobile phone based on associated received signal strength. During operation, the mobile phone may change its locations rather quickly and may sometimes even be out of range of associated supporting networks such as, for example, WiFi, WiMAX, and/or global navigation satellite systems (GNSS), for extended periods. As a result, the mobile phone has to quickly acquire a position fix of the mobile phone and also be capable of operating in harsh signal propagation environments with low power consumption.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a location-based broker service (LBS) client broker, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
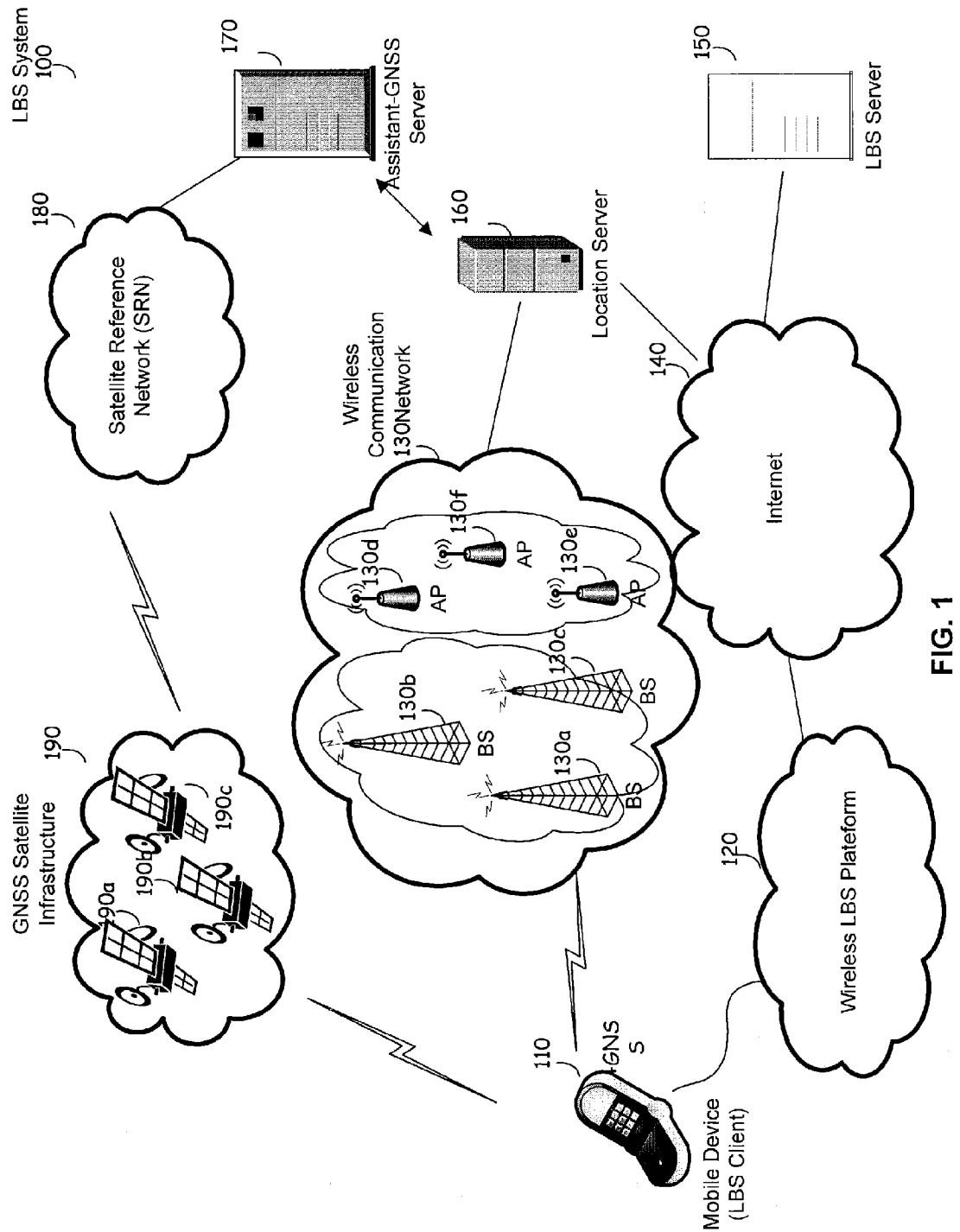
FIG. 1 is a diagram illustrating an exemplary location-based services (LBS) system that enables operation of a LBS client on a global navigation satellite system GNSS enabled handset, in accordance with an embodiment of the invention.

Certain embodiments of the invention may be found in a method and system for a location-based broker service (LBS) client broker. Various aspects of the invention may enable a GNSS enabled handset to receive signals from various different resources such as from GNSS satellites and/or from a wireless communication network. The GNSS enabled handset may be enabled to acquire location information, comprising global positioning data, from the received signals. In instances where a position fix is required by a particular location based service (LBS) application, the GNSS enabled handset may be operable to calculate a plurality of possible position fixes associated with the GNSS enabled handset based on the acquired location information using various positioning approaches. In addition, a current position fix associated with the GNSS enabled handset may be determined based on the plurality of calculated possible position fixes via running a LBS client on the GNSS enabled handset. The acquired location information may comprise various positioning resource data such as, for example, GNSS data, GNSS assistance data, LTO data, reference positions, reference time, positioning approaches, WiFi data WiMAX data, and/or cellular data. Exemplary GNSS assistance data may comprise assisted GPS (AGPS) data. The LBS client may be enabled to determine the plurality of possible position fixes associated with the GNSS enabled handset based on one or more acquired data such as, for example, GNSS data, GNSS assistance data, LTO data, reference positions, reference time, FEMTOCELL data, wireless PAN data, WLAN data, WiMAX data, cellular data, and/or user input.

The various positioning approaches may be selected in a particular or determined order based on the acquired location information. The LBS client may be enabled to calculate each of the plurality of possible positions of the GNSS enabled handset in the determined order based on the acquired location information. Corresponding confidence levels for each of the calculated plurality of possible positions are determined in the determined order. The current position fix associated with the GNSS enabled handset may be refined based on corresponding determined confidence levels associated with the calculated plurality of possible positions. The current position fix associated with the GNSS enabled handset may be refined in various ways by using current calculated possible position and/or previous calculated possible positions. For example, the LBS client may be enabled to combine or select one of the current calculated possible position and previous calculated possible positions to represent the refined determined current position fix. The LBS client may be enabled to communicate the refined determined current position fix to a location server using a wireless LBS platform. The GNSS enabled handset may be enabled to receive a location-based service from a LBS application server based on the refined determined current position fix associated with the GNSS enabled handset.

FIG. 1 is a diagram illustrating an exemplary location-based services (LBS) system that enables operation of a LBS client on a global navigation satellite system GNSS enabled handset, in accordance with an embodiment of the invention. Referring to FIG. 1, there is shown a LBS system 100 comprising a GNSS enabled handset 110, a wireless LBS platform 120, a wireless communication network 130, Internet 140, a LBS application server 150, a location server 160, an assistant GNSS server 170, a satellite reference network (SRN) 180, and a GNSS satellite infrastructure 190. The wireless communication network 130 comprises a plurality of communication nodes such as base stations (BS) and/or access points (AP), of which BS 130a-130c and AP 130d-130e are displayed, respectively. The GNSS satellite infrastructure 190 comprises a plurality of GNSS satellites, of which GNSS satellites 190a-190c are displayed.

The GNSS enabled handset 110 may comprise suitable logic, circuitry and/or code that may be enabled to receive GNSS signals from a plurality of GNSS satellites such as the GNSS 180a through 180c to determine a position fix of the GNSS enabled handset 110. In order to quickly determine a position fix, the GNSS enabled handset 110 may be enabled to acquire GNSS assistance data from the assistant GNSS server 160 via the wireless communication network 130. In instances where the long term orbits (LTO) technology may be enabled at the assistant GNSS server 160, the GNSS enabled handset 110 may be enabled to receive LTO data via the wireless communication network 130 to calculate a fast position fix even without a continuous communication network connection.

The GNSS enabled handset 110 may be capable of transmitting and/or receiving radio signals via the wireless communication network 130, which may be compliant with various telecommunication standards. For example, the BS 130a-130c may be 3GPP, 3GPP2, and WiMAX compliant, while the AP 130d-130e may be FEMTOCELL, IEEE 802.15 PAN, IEEE 802.11 WLAN or WiFi compliant access points. The GNSS enabled handset 110 may be enabled to determine a position fix based on the received radio signals from the wireless communication network 130. In various embodiments of the invention, a plurality of positioning or location-based approaches may be utilized to support wireless communication network-based positioning. In an exemplary embodiment of the invention, a WiFi-based positioning approach may be implemented by correlating received signal strength such as, for example, received signal strength indicator (RSSI), to distances among associated WiFi access points such as the APs 130d-130e. A change in RSSI values may be related to corresponding distances among the APs 130d-130e. A position fix of the GNSS enabled handset 110 may be calculated using various positioning models such as path loss model and/or triangulation model based on associated RSSI values of the received signals from multiple APs. The GNSS enabled handset 110 may communicate the calculated position fix with the location server 160 for various LBS applications provided by the LBS server 150.

The GNSS enabled handset 110 may be operable to capture and/or determine global positioning data comprising various technology specific positioning resource data such as, for example, GNSS data, long term orbit (LTO) data, reference positions, reference times, WiFi data, WiMAX data, cellular data, and/or positioning approaches. In this regard, the GNSS enabled handset 110 may be operable to calculate a set of position fixes based on the captured global positioning data using various positioning approaches such as, for example, GNSS-based, LTO-based, WiFi-based, WiMAX-based, and cellular-based. The GNSS enabled handset 110 may be configured to calculate the set of position fixes by executing a LBS client on the GNSS enabled handset 110. Moreover, the LBS client may be enabled to determine and provide a best position fix based on the set of calculated position fixes. The determined best position fix may be communicated to the LBS server 150, where it may be used for retrieving a particular LBS application. The GNSS enabled handset 110 may then be provided with the retrieved particular LBS application, or information related to the particular LBS application, by the LBS server 150 using the wireless LBS platform 120.

The wireless LBS platform 120 may comprise suitable logic, circuitry and/or code that may enable operation of various LBS applications, which are provided by the LBS server 150 to various communication devices such as the GNSS enabled handset 110. The wireless LBS platform 120 may be operable to play an interface role such as, for example, providing an interface between the GNSS enabled handset 110 and the LBS server 150 via an IP network such as the Internet 140. In this regard, the wireless LBS platform 120 may be operable to communicate with the GNSS enabled handset 110 via a LBS client operating on the GNSS enabled handset 110. The wireless LBS platform 120 may be enabled to support various functions such as authentication, authorization and/or billing for various LBS applications offered by the LBS server 150. In this regard, the wireless LBS platform 120 may be enabled to perform position fix calculations based on captured global positioning data from the GNSS enabled handset 110 using various associated positioning approaches such as, for example, GNSS-based, LTO-based, WiFi-based, WiMAX-based, and cellular-based.

The wireless communication network 130 may comprise suitable logic, circuitry and/or code that may be enabled to support various voice and/or data services via the BS 130a-130d and/or the AP 130d-130e. The wireless communication network 130 may be operable to support various telecommunication standards such as, for example, CDMA 2000, WCDMA, GSM, UMTS, LTE, WiFi, and/or WiMAX communication standards. The wireless communication network 130 may be enabled to communicate various LBS applications from the LBS server 150 to a plurality of associated communication devices such as the GSNN enabled handset 110 via the internet 140.

The Internet 140 may comprise suitable logic, devices and/or code that enables data communication via various network wired and/or wireless technologies using IP protocols. The Internet 140 may be operable to provide communication between the LBS server 150 and the GNSS enabled handset 110.

The LBS server 150 may comprise suitable logic, devices and/or code that is enabled to retrieve various information such as, for example, a requested hotel addresses and a map of the vicinity of areas of interest. The LBS server 150 may be enabled to communicate the retrieved information with various communication devices such as the GNSS enabled handset 110 based on an associated position fix. The LBS server 150 may utilize the wireless LBS platform 120 to deliver the retrieved information to the GNSS enabled handset 110.

The location server 160 may comprise suitable logic, devices and/or code that may enable retrieval of location information for residential as well as enterprise users. In this regard, the location server 160 may be enabled to identify various locations associated with communication devices such as the GNSS enabled handset 110. Depending on device capabilities, the locations associated with the GNSS enabled handset 110 may correspond to an associated WiFi location, WiMAX location, and/or GSM location. Location information such as Cell-ID may be provided either directly by the wireless communication network 130 or by the GNSS enabled handset 110 using various signaling such as, for example, a short message service (SMS). The Cell-ID may be provided via in-band signaling and/or out-of-band signaling.

The location server 160 may be enabled to translate the location information into latitude and longitude of an associated open infrastructure such as, for example, a serving WiFi tower, a serving WiMAX tower, a cell base station. The latitude and longitude of the associated open infrastructure may be communicated with the LBS server 150 to be used for retrieving a particular LBS application to the GNSS enabled handset 110. In instances where the assistant GNSS technology may be utilized, the location server 160 may be enabled to acquire GNSS assistance data from the assistant GNSS server 170. The acquired GNSS assistance data may be communicated to one or more GNSS enabled receivers such as the GNSS enabled handset 110 to implement the assistant GNSS technique.

The assistant GNSS server 170 may comprise suitable logic, circuitry and/or code that may be operable to access the satellite reference network (SRN) 180 to collect GNSS satellite data by tracking GNSS constellations through the SRN 180. The assistant GNSS server 170 may be enabled to generate GNSS assistance data to provide to the GNSS enabled handset 110 via the wireless communication network 130. In addition, the assistant GNSS server 170 may be configured to use long term orbits (LTO) technology to supply accurate GNSS assistance data that may be valid for, for example, up to 30 days in the future. This may enable the benefits of assistant GNSS technology to be realized by the GNSS enabled handset 110 when the GNSS enabled handset 110 may temporarily be out of the range of the wireless communication network 130. The assistant GNSS server 170 may be operable to communicate messages in various exemplary formats compatible with various telecommunication networks such as GSM/UMTS, WiFi, LTE, and/or WiMAX. For example, the assistant GNSS server 170 may be GSM/UMTS standard compliant by supporting messaging in RRLP format, PCAP interface, OMA SUPLv1.0, and others. The assistant GNSS server 170 may be configured to communicate with the location server 160 via either a user-plane or a control-plane to seamlessly connect with the location server 160.

The satellite reference network (SRN) 180 may comprise suitable logic, circuitry and/or code that may be enabled to collect and distribute data for GNSS satellites on a continuous basis. The SRN 180 may comprise a plurality of GNSS reference receivers located around the world to constantly provide assistant GNSS coverage in a home or local network and/or visited network. This may enable users of GNSS enabled devices such as the GNSS enabled handset 110 to roam with their LBS applications anywhere in the world. The SRN 180 may ensure high levels of availability, reliability, and performance.

The GNSS satellite infrastructure 190 may comprise suitable logic, circuitry and/or code that may be enabled to generate and broadcast suitable GNSS signals via a plurality of GNSS satellites such as the GNSS satellites 190a-190c. The broadcasted GNSS signals may be received by a GNSS satellite receiver integrated in the GNSS enabled handset 110. The received broadcast GNSS signals may be utilized to determine navigation and/or location information comprising, for example, position, velocity, and clock information of the GNSS enabled handset 110. The GNSS satellite infrastructure 190 may comprise various navigation satellite systems such as, for example, the Global Positioning System (GPS) system, the Global Orbiting Navigation Satellite System (GLONASS) system, and/or the satellite navigation system GALILEO system.

In operation, the GNSS enabled handset 110 may be operable to receive signals from the GNSS satellites 190a-190c and/or from the wireless communication network 130, respectively. Depending on device capabilities, the GNSS enabled handset 110 may be capable of capturing or learning global positioning data based on the received signals. The captured global positioning data may comprise various positioning resource data such as, for example, GNSS data, GNSS assistance data, LTO data, reference positions, reference time, positioning approaches, WiFi data WiMAX data, and/or cellular data. In instances where a position fix may be required by a particular LBS application, the GNSS enabled handset 110 may be enabled to calculate a set of position fixes based on the captured global positioning data. The set of position fixes may be calculated by running a LBC client inside the GNSS enabled handset 110. The set of position fixes may be calculated using various positioning approaches such as, for example, GNSS-based, assistance GNSS-based, LTO-based, WiFi-based, WiMAX-based, and/or cellular-based. In addition, the LBS client on the GNSS enabled handset 110 may be enabled to determine a best or more accurate position fix based on the set of calculated position fixes. The determined best or more accurate position fix may be communicated with the LBS server 150 via the wireless communication network 130. The LBS server 150 may retrieve the particular LBS application based on the determined best position fix. The retrieved particular LBS application may be provided to the GNSS enabled handset 110 using the wireless LBS platform 120.

Figure 2:
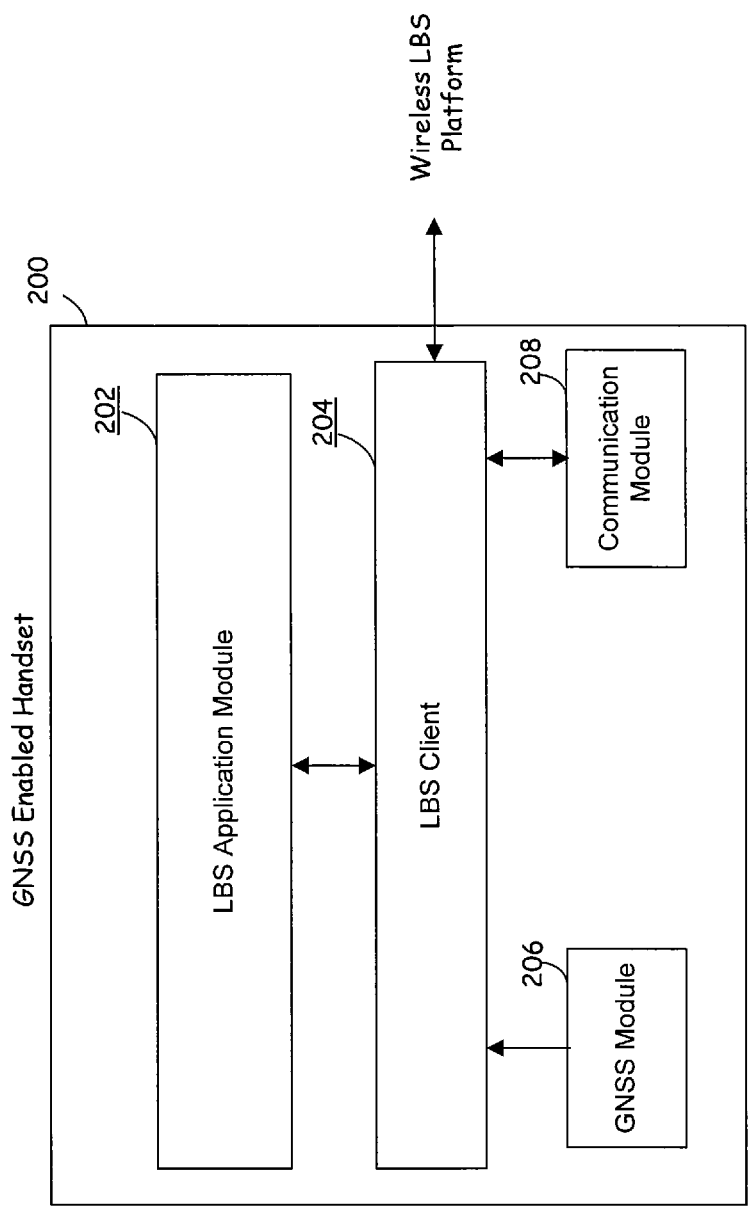
FIG. 2 is a diagram illustrating an exemplary GNSS enabled handset that enables operation of a LBS client on the GNSS enabled handset for LBS applications, in accordance with an embodiment of the invention.

FIG. 2 is a diagram illustrating an exemplary GNSS enabled handset that enables operation of a LBS client on the GNSS enabled handset for LBS applications, in accordance with an embodiment of the invention. Referring to FIG. 2, there is shown a GNSS enabled handset 200 comprising LBS application module 202, a LBS client 204, a GNSS module 206, and a communication module 208.

The LBS application module 202 may comprise suitable logic, circuitry and/or code that may be enabled to present various LBS applications such as, for example, Internet locating service, E-911 service, location utility service, geographic presentation service, and/or route service. The data types associated with an LBS application may comprise geographic maps or geo-referenced satellite images, textual, and/or numeric as html pages, and/or audio video streaming files.

The LBS client 204 may comprise suitable logic, circuitry and/or code that may be enabled to provide a best position fix associated with the GNSS enabled handset 200 for various LBS applications provided by the LBS server 150. The LBS client 204 may be enabled to capture or determine global positioning data comprising various positioning resource data such as, for example, GNSS data, LTO data, reference positions, reference times, WiFi data, WiMAX data, cellular data, and/or positioning approaches. The LBS client 204 may be operable to calculate a set of position fixes associated with the GNSS enabled handset 200 based on the captured global positioning data via various positioning approaches. Depending on device capabilities, the various positioning approaches may comprise GNSS-based, assistance GNSS-based, LTO-based, WiFi-based, WiMAX-based, and/or cellular-based. The LBS client 204 may be configured to perform corresponding position computation either in the LBS client 204 or in the wireless LBS platform 120. Based on the set of calculated position fixes associated with the GNSS enabled handset 200, the LBS client 204 may be enabled to determine a best position fix associated with the GNSS enabled handset 200. The determined best position fix may be communicated with the LBS server 150 for LBS applications to the GNSS enabled handset 200.

The GNSS module 206 may comprise suitable logic, circuitry and/or code that may be enabled to receive GNSS signals. The GNSS module 206 may be enabled to process the received GNSS signals and communicate with the LBS client 204 to support various LBS applications.

The communication module 208 may comprise suitable logic, circuitry and/or code that may be enabled to transmit and/or receive radio signals over the wireless communication network 130. The communication module 208 may be enabled to process the received radio signals and communicate with the LBS client 204 to support various LBS applications. The received radio signals may comprise various positioning resource data such as, for example, GNSS assistance data, LTO data, reference positions, reference time, and/or protocols supported.

In operation, the GNSS enabled handset 200 may be enabled to receive GNSS signals via the GNSS module 206 and telecommunication signals via the communication module 208, respectively. The LBS client 204 may be enabled to capture global positioning data from the received GNSS signals and the received telecommunication signals, respectively. The LBS client 204 may be operable to calculate a set of position fixes associated GNSS enabled handset 200 based on the acquired global positioning data. The set of position fixes associated with the GNSS enabled handset 200 may be calculated by using various positioning approaches such as, for example, GNSS-based, assistance GNSS-based, LTO-based, WiFi-based, WiMAX-based, and/or cellular-based. Based on the set of calculated position fixes, a best position associated with the GNSS enabled handset 200 may be determined by the LBS client 204. The LBS client 204 may communicate the determined best position fix to the LBS server 150 for LBS application retrieving.

Figure 3:
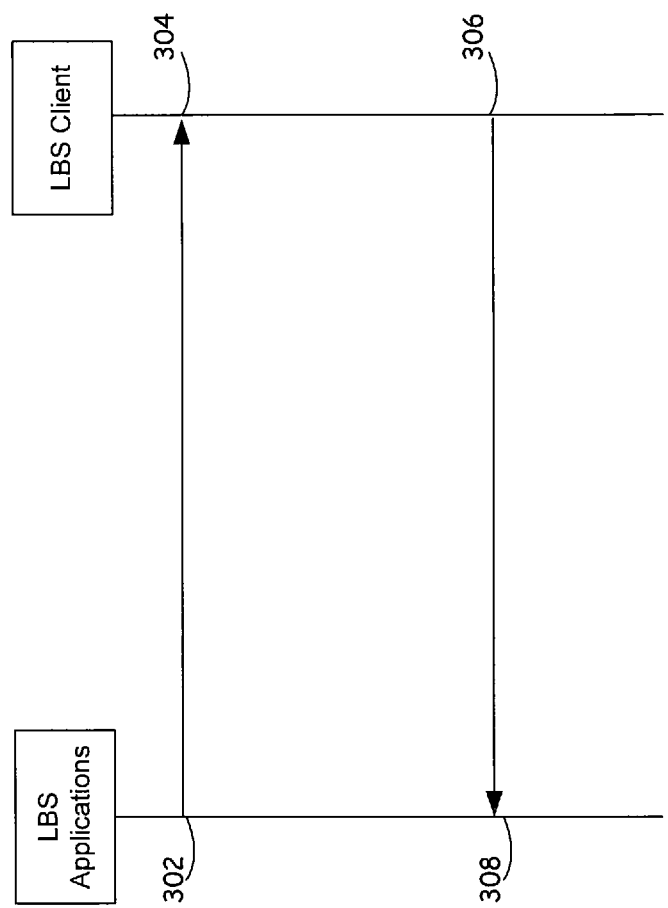
FIG. 3 is a flow chart illustrating an exemplary call flow that illustrates exemplary operation of a LBS client on a GNSS enabled handset, in accordance with an embodiment of the invention.

FIG. 3 is a flow chart illustrating an exemplary call flow that illustrates exemplary operation of a LBS client on a GNSS enabled handset, in accordance with an embodiment of the invention. Referring to FIG. 3, the exemplary steps start with step 302, where a particular LBS application provided by the LBS server 150 may request a position fix associated with the GNSS enabled handset 200 to the LBS client 204 using the wireless LBS platform 120.

In step 304, upon receiving the request, the LBS client 204 may be enabled to determine a best position fix associated with the GNSS enabled handset 200 based on acquired global positioning data. The captured global positioning data may comprise information from the wireless communication network 130 as well as from the GNSS satellite infrastructure 190. Based on the captured global positioning data, the LBS client 204 may be enabled to calculate a set of position fixes associated with the GNSS enabled handset 200 using various positioning approaches. The various positioning approaches may be GNSS-based, WiFi-based, WiMAX-based, and cellular-based. Depending on implementation, position computation may be performed either in the LBS client 204 or in the LBS platform 120. The LBS client 204 may be enabled to determine a best position fix associated with the GNSS enabled handset 200 based on the set of calculated position fixes using a broker algorithm.

In step 306, the LBS client 204 may communicate the determined best position fix to the LBS server 150 for retrieving the particular LBS application to the GNSS enabled handset 200.

In step 308, upon receiving the determined best position fix associated with the GNSS enabled handset 200, the LBS server 150 may retrieve the particular LBS application and may communicate it to the GNSS enabled handset 200 using the wireless LBS platform 120.

Figure 4:
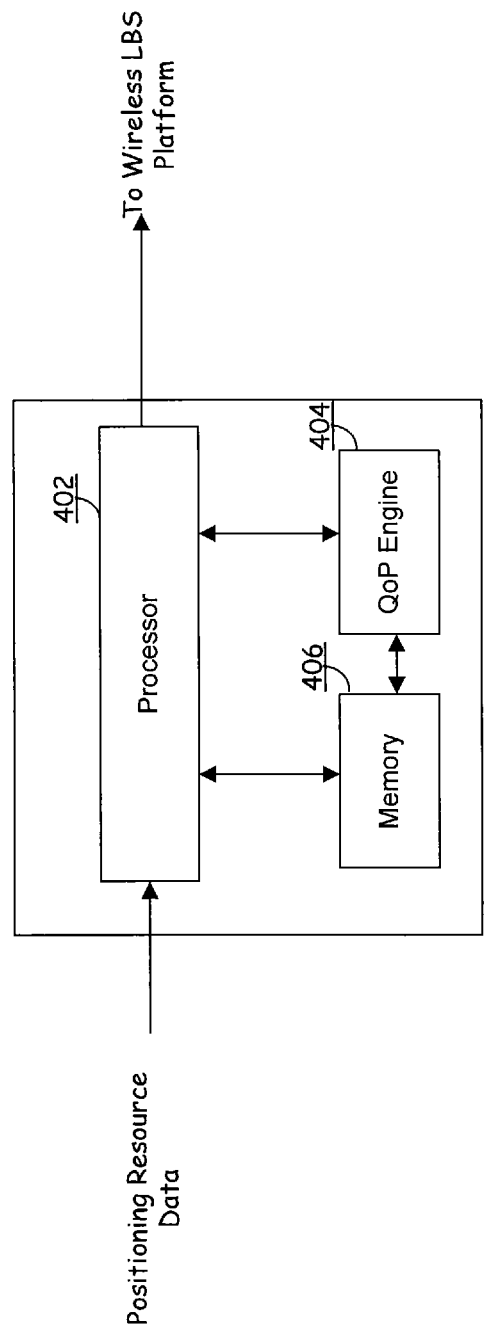
FIG. 4 is a diagram illustrating an exemplary LBS client that is operable to determine a best position fix based on global navigation satellite system data, in accordance with an embodiment of the invention.

FIG. 4 is a diagram illustrating an exemplary LBS client that is operable to determine a best position fix based on global navigation satellite system data, in accordance with an embodiment of the invention. Referring to FIG. 4, there is shown a LBS client 400 comprising a processor 402, a QoP engine 404, and a memory 406.

The processor 402 may comprise suitable logic, circuitry and/or code that may be enabled to capture or learn global positioning data from various positioning resource data and store in the memory 406. In instances where a position fix associated with the GNSS enabled handset 200 may be required for a particular LBS application, the processor 402 may be enabled to acquire a best position fix associated with the GNSS enabled handset 200 from the QoP engine 404.

The QoP engine 404 may comprise suitable logic, circuitry and/or code that may be enabled to provide the best position fix associated with the GNSS enabled handset 200. In this regard, the QoP engine 404 may be enabled to calculate a set of position fixes based on the captured global positioning data using various positioning approaches such as GNSS-base and/or cellular-based. Each calculated position fix may be evaluated by associated confidence level and/or associated uncertainty level. The confidence level and/or uncertainty level associated with a calculated position fix may be specified in various ways. For example, an associated confidence level and/or associated uncertainty level of the $i^{th}$ calculated position fix may be defined as following:

$$\text{confidence level} = 1 - \frac{|P_i - P_{mean}|}{P_{mean}}, \text{ and}$$

$$\text{uncertainty level} = \frac{|P_i - P_{mean}|}{P_{mean}}$$

where $P_{mean}$ and $P_i$ are the mean position fix and i-th calculated position fix of the calculated set of position fixes associated with the GNSS enabled handset 200. i is a positive integer.

Based on the set of calculated position fixes, the QoP engine 404 may be enabled to determine the best position fix associated with the GNSS enabled handset 200 for the particular LBS application. For example, the QoP engine 404 may be enabled to determine the best position fix by selectively combining one or more calculated position fixes based on associated confidence levels and/or uncertainty levels.

The memory 406 may comprise suitable logic, circuitry and/or code that may enable storing of information such as configuration data, executable instructions and data that may be utilized by the processor 402 and the QoP engine 404, respectively. The executable instructions may comprise instructions that may enable performing position computation in the QoP engine 404 or in the LBS platform 120. The data may comprise global positioning data such like, for example, GNSS data (navigation satellite data such as GPS data, GLONASS data, and/or GALILEO data), GNSS assistance data, LTO data, reference positions, reference time, positioning approach information, and associated protocol information. The memory 406 may comprise RAM, ROM, low latency nonvolatile memory such as flash memory and/or other suitable electronic data storage.

In operation, various positioning resource data from the GSNN module 206 and/or the communication module 208 may be received by the processor 402. The processor 402 may be enabled to capture global positioning data based on the received positioning resource data and store in the memory 406. In instances where a position fix associated with the GNSS enabled handset 200 may be requested for a particular LBS application, the processor 402 may communicate with the QoP engine 404 to determine a best or accurate position fix associated with the GNSS enabled handset 200 for the particular LBS application. The QoS engine 404 may apply a broker algorithm and determine the best position fix based on a set of position fixes associated with the GNSS enabled handset 200. The set of position fixes may be calculated based on the captured global positioning data by using various positioning approaches such as, for example, GNSS-based, LTO-based, WiFi-based, WiMAX-based, and/or cellular-based.

Figure 5:
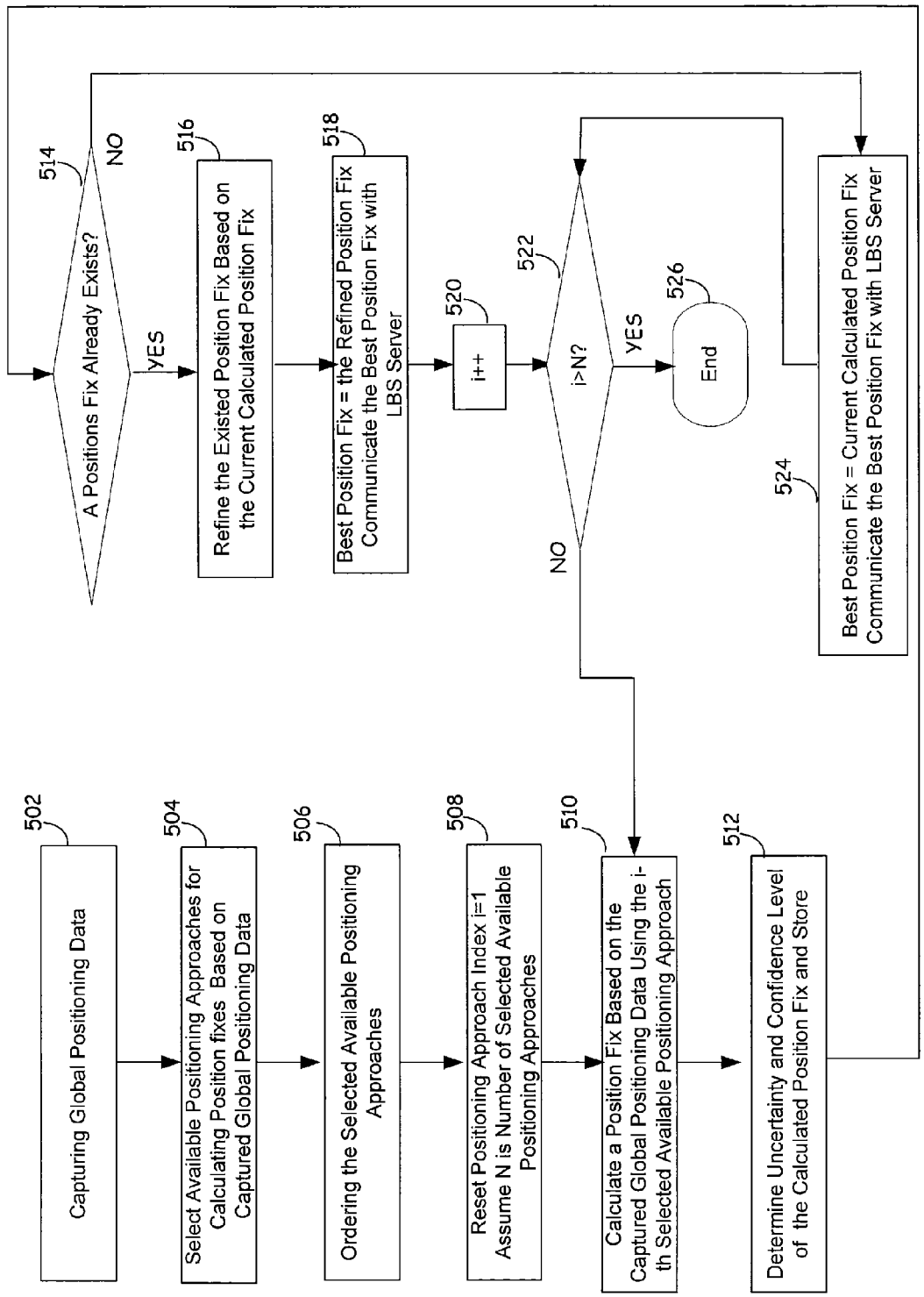
FIG. 5 is a flow chart illustrating exemplary steps for calculating a best position fix for LBS, in accordance with an embodiment of the invention.

FIG. 5 is a flow chart illustrating exemplary steps for calculating a best position fix for LBS, in accordance with an embodiment of the invention. Referring to FIG. 5, the exemplary steps start with step 502, where the LBS client 400 may be enabled to capture global positioning data via the GNSS module 206 and the communication module 208, respectively. In step 504, the LBS client 400 may be enabled to determine available positioning approaches associated with the captured global data. In step 506, the selected available positioning approaches may be ordered depending on, for example, computational complexity. In step 508, a positioning approach index i may be reset or initialized to 1. For illustrative purposes, the number of total available positioning approaches is equal to a positive integer N. In step 510, a position fix associated with the GNSS enabled handset 200 may be calculated by executing the LBS client 400 based on the captured global positioning data by using the i-th selected available positioning approach. In step 512, metrics such as uncertainty level and/or confidence level associated with the calculated position fix may be determined and may be stored in the memory 406.

In step 514, it may be determined whether a position fix associated with the GNSS enabled handset 200 already exists in the LBS client 400. In instances where a position fix associated with the GNSS enabled handset 200 already exists in the LBS client 400, then in step 516, the existed position fix associated with the GNSS enabled handset 200 may be refined based on the current calculated position fix. In step 518, the refined position fix may be assigned as the best or more accurate position fix associated with the GNSS enabled handset 200. The best position fix may be communicated to the LBS server 150, the latter of which may determine the LBS application based on the best position fix. The determined LBS application may be communicated from the LBS server 150 to the GNSS enabled handset 200. In step 520, increase the position approach index a step of 1. In step 522, determine if the position approach index is greater than N. In instances where the position approach index is greater than N, then, the exemplary steps end at step 526. In step 514, in instances where no position fix associated with the GNSS enabled handset 200 exists in the LBS client 400, then in step 524, the refined position fix may be assigned the current calculated position fix associated with the GNSS enabled handset 200. The best or most accurate position fix may be communicated with the LBS server 150 via the LBS client 400. In step 522, in instances where the position approach index is less than or equal to N, then the exemplary steps may continue in step 510.

Figure 6:
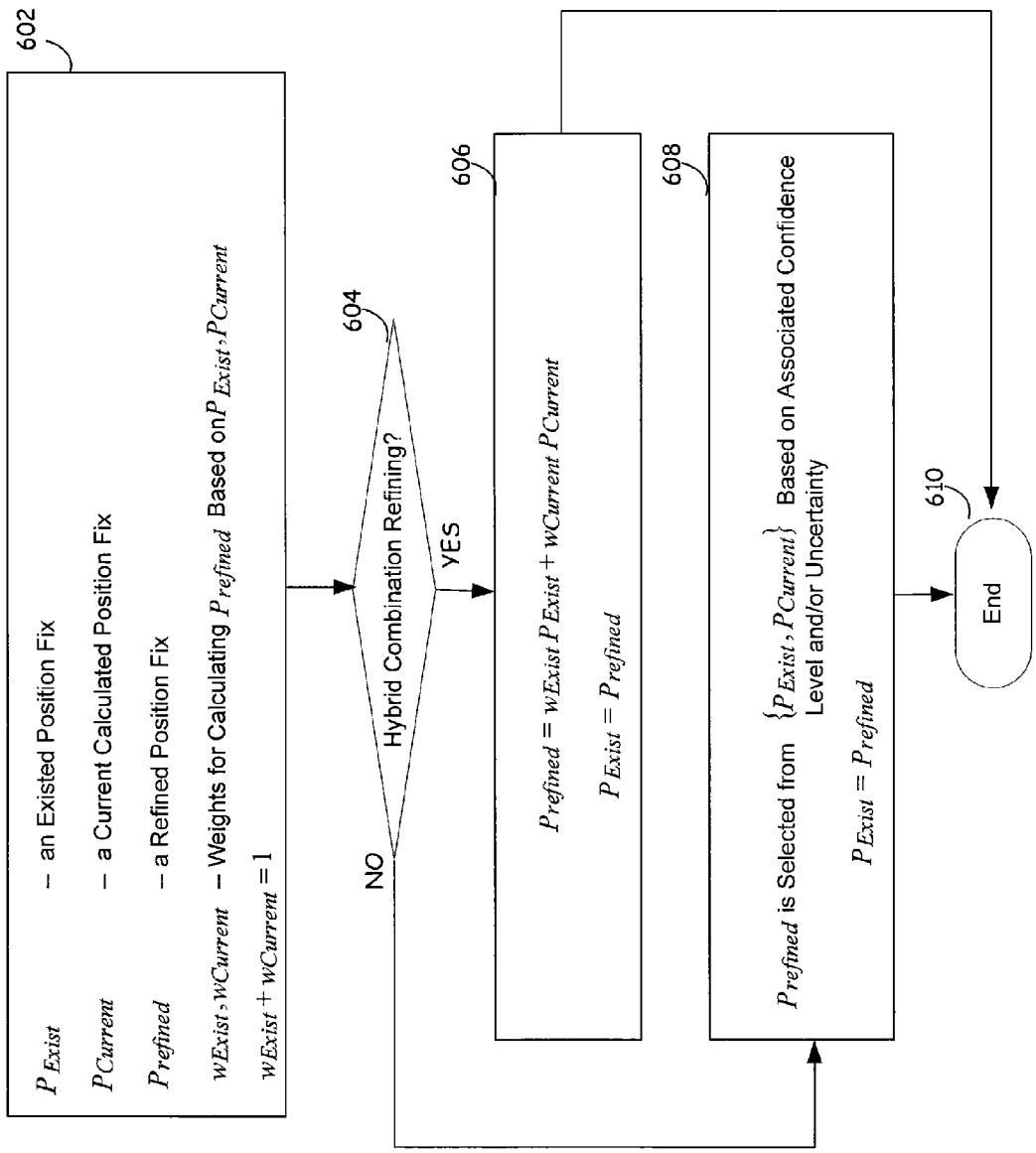
FIG. 6 is a flow chart illustrating exemplary steps for refining a position fix for LBS, in accordance with an embodiment of the invention.

FIG. 6 is a flow chart illustrating exemplary steps for refining a position fix for LBS, in accordance with an embodiment of the invention. Referring to FIG. 6, the exemplary steps start with step 602, where, $P_{Exist}$, $P_{current}$, and $P_{refined}$ may indicate an existing position fix, a current calculated position fix, and a refined position fix, respectively, for the GNSS enabled handset 200. Weights, $w_{Exist}$ and $w_{Current}$ are used for calculating $P_{Refined}$ by combining $P_{Exist}$ and $P_{current}$, and $w_{Exist} + w_{Current} = 1$. In step 604, determine if a hybrid combination refining approach may be used. In instances where a hybrid combination refining approach may be used, then in step 606, the refined position fix $P_{Refined}$ associated with the GNSS enabled handset 200 may be calculated as follows:

$$P_{Refined} = w_{Exist} P_{Exist} + w_{Current} P_{Current}$$

The existing position fix $P_{Exist}$ may be updated by setting $P_{Exist} = P_{Refined}$.

In step 604, in instances where a hybrid combination refining method may not be used, then in step 608, the refined position fix $P_{Refined}$ associated with the GNSS enabled handset 200 may be picked from $\{P_{Exist}, P_{Current}\}$ based on associated confidence levels and/or uncertainty levels. A position fix in $\{P_{Exist}, P_{Current}\}$ with a higher confidence level and/or a lower uncertainty level may be selected as the best position fix. The $P_{Exist}$ may be updated by setting $P_{Exist} = P_{Refined}$.

Aspects of a method and system for a location-based broker service (LBS) client broker are provided. In accordance with various exemplary embodiments of the invention, the GNSS enabled handset 110 may be enabled to receive signals from various resources such as the GNSS satellites 190a-190c and/or from the wireless communication network 130. Depending on device capabilities, the GNSS enabled handset 110 may be enabled to capture global positioning data from the received signals. In instances where a position fix may be required by a particular LBS application provided by the LBS server 150, the GNSS enabled handset 110 may be enabled to calculate a set of position fixes associated with the GNSS enabled handset 110 based on the captured global positioning data using various positioning approaches. In addition, a best position fix associated with the GNSS enabled handset 110 may be determined based on the set of calculated position fixes via execution of the LBS client 204 on the GNSS enabled handset 110. The captured global positioning data may comprise various positioning resource data such as, for example, GNSS data, GNSS assistance data, LTO data, reference positions, reference time, positioning approaches, WiFi data WiMAX data, and/or cellular data. Exemplary GNSS assistance data may comprise assisted GPS (AGPS) data.

The LBS client 204 may be enabled to utilize various positioning approaches such as, for example, GNSS-based, assistance GNSS-based, LTO-based, WiFi-based, WiMAX-based, and/or cellular-based, for computing the set of position fixes associated with the GNSS enabled handset 110. The LBS client 204 may be configured to perform the various positioning approaches with or without assistance of reference positions and/or reference time associated with the acquired global positioning data. The various positioning approaches may be selected based on the acquired global positioning data in a determined order. For example, the various positioning approaches may be used in order according to corresponding computational complex levels. As described with respect to, for example, FIG. 5, a first position fix associated with the GNSS enabled handset 110 may be calculated using a first selected positioning approach, which may correspond to the lowest computational level in the selected various positioning approaches. As described with respect to, for example, FIG. 6, the first calculated position fix may be consecutively refined by associated subsequent position fixes calculated using corresponding positioning approaches according to the determined order. In order to determine a best or more accurate position fix associated with the GNSS enabled handset 110, the first calculated position fix may be consecutively refined in a way by combining the first calculated position fix with associated subsequent calculated position fixes associated with the GNSS enabled handset 110. Alternatively, the first calculated position fix may be consecutively refined in a way by selecting a particular calculated position fix from the first calculated position fix and associated subsequent calculated position fixes associated with the GNSS enabled handset 110. The best or most accurate position fix associated with the GNSS enabled handset 110 may be determined based on the refined first calculated position. The determined best or more accurate position fix may be communicated with the LBS server 150 via the wireless communication network 130. The GNSS enabled handset 110 may be enabled to receive the particular LBS application provided by the LBS server 150 using the wireless LBS platform 120. The particular LBS application may be retrieved by the LBS server 150 based on the determined best position fix associated with the GNSS enabled handset 110.

In accordance with various embodiments of the invention, the GNSS enabled handset 110 may be operable to receive signals from various different resources such as the GNSS satellites 190*a*-190*c* and/or from the wireless communication network 130. The GNSS enabled handset 110 may be operable to acquire location information represented by global positioning data from the received signals. As described, for example with respect to FIGS. 2-4, in instances where a position fix may be required by a particular LBS application provided by the LBS server 150, the GNSS enabled handset 110 may be enabled to calculate a plurality of possible position fixes associated with the GNSS enabled handset 110 based on the acquired location information using various positioning approaches. In addition, a current position fix associated with the GNSS enabled handset 110 may be determined based on the plurality of calculated possible position fixes via running the LBS client 204 on the GNSS enabled handset 110. The acquired location information may comprise various positioning resource data such as, for example, GNSS data, GNSS assistance data, LTO data, reference positions, reference time, positioning approaches, WiFi data WiMAX data, and/or cellular data. Exemplary GNSS assistance data may comprise assisted GPS (AGPS) data.

The LBS client 204 may be enabled to determine the plurality of possible position fixes associated with the GNSS enabled handset 110 based on one or more acquired data such as, for example, GNSS data, GNSS assistance data, LTO data, reference positions, reference time, FEMTOCELL data, wireless PAN data, WLAN data, WiMAX data, cellular data, and/or user input. The various positioning approaches may be selected in a specific or determined order based on the acquired location information. As described with respect to, for example, FIG. 5 and FIG. 6, the LBS client 204 may be enabled to calculate each of the plurality of possible positions of the GNSS enabled handset 110 in the determined order based on the acquired location information. Corresponding confidence levels for each of the calculated plurality of possible positions are determined in the determined order.

The current position fix associated with the GNSS enabled handset 110 may be refined based on corresponding determined confidence levels associated with the calculated plurality of possible positions. The current position fix associated with the GNSS enabled handset 110 may be refined in various ways by using, for example, current calculated possible position and/or previous calculated possible positions. For example, the LBS client 204 may be enabled to combine or select one of the current calculated possible position and previous calculated possible positions to represent the refined determined current position fix. The LBS client 204 may be enabled to communicate the refined determined current position fix to the location server 160 using the wireless LBS platform 120. In return, the GNSS enabled handset 110 may be enabled to receive a location-based service from the LBS server 150 based on the refined determined current position fix associated with the GNSS enabled handset 110.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for a location-based broker service (LBS) client broker.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing signals, the method comprising:
in a GNSS enabled device:
receiving location information of said GNSS enabled device from a plurality of different wireless resources;
determining a position fix for said GNSS enabled device utilizing said received location information from each of said plurality of different wireless resources, said determining being performed in a pre-determined order according to a complexity of computing each of said position fixes; and selecting one of said computed position fixes as a current position of said GNSS enabled device.

2. The method according to claim 1, wherein said received location information for each of said plurality of wireless resources comprises GNSS data, GNSS assistance data, LTO data, reference positions, reference time, FEMTOCELL data, wireless PAN data, WLAN data, WiMAX data and/or cellular data.

3. The method according to claim 2, comprising determining said position fix for said GNSS enabled device based on one or more of said GNSS data, said GNSS assistance data, said LTO data, said reference positions, said reference time, said FEMTOCELL data, said wireless PAN data, said WLAN data, said WiMAX data, said cellular data, and/or said user input.

4. The method according to claim 1, wherein said location information for one of said plurality of different wireless resources is different from said location information for another of said plurality of different wireless resources.

5. The method according to claim 1, further comprising determining a confidence level for each of said determined position fixes.

6. The method according to claim 5, further comprising refining a current position based on one or more of said determined confidence level for each of said determined position fixes.

7. The method according to claim 1, further comprising refining a current position based on a previously determined position fix and/or subsequently determined position fix based on said pre-determined order.

8. The method according to claim 7, further comprising selecting one of said current position and said previously determined position fix to represent said refined current position.

9. The method according to claim 7, further comprising combining said current position and said previously determined position fix to represent said refined current position.

10. The method according to claim 7, further comprising communicating said refined current position to a location-based server.

11. A system of processing signals, the system comprising:
a memory for use in a GNSS enabled device; and
a processor and/or circuit, coupled to the memory, for use in said GNSS enabled device, said processor and/or circuit configured to:
receive location information of said GNSS enabled device from a plurality of different wireless resources;
determine a position fix for said GNSS enabled device utilizing said received location information from each of said plurality of different wireless resources in a pre-determined order according to a complexity of computing each of said position fixes; and
select one of said computed position fixes as a current position of said GNSS enabled device.

12. The system according to claim 11, wherein said received location information for each of said plurality of resources comprises GNSS data, GNSS assistance data, LTO data, reference positions, reference time, FEMTOCELL data, wireless PAN data, WLAN data, WiMAX data, and/or cellular data.

13. The system according to claim 12, wherein said one or more processors and/or circuits are configured to determine said position fix for said GNSS enabled device based on one or more of said GNSS data, said GNSS assistance data, said LTO data, said reference positions, reference time, FEMTOCELL data, wireless PAN data, WLAN data, WiMAX data, cellular data, and/or user input.

14. The system according to claim 11, wherein said location information for one of said plurality of different wireless resources is different from said location information for another of said plurality of different wireless resources.

15. The system according to claim 11, wherein said processor and/or circuit is further configured to determine a confidence level for each of said determined position fixes.

16. The system according to claim 15, wherein said processor and/or circuit is further configured to refine a current position based on one or more of said determined confidence level for each of said determined position fixes.

17. The system according to claim 11, wherein said processor and/or circuit is further configured to refine a current position based on a previously determined position fix and/or a subsequently determined position fix based on said pre-determined order.

18. The system according to claim 17, wherein said processor and/or circuit is further configured to select one of said current position and said previously determined position fix to represent said refined current position.

19. The system according to claim 17, wherein said processor and/or circuit is further configured to combine said current position and said previously determined position fix to represent said refined current position.

20. A system of processing signals, the system comprising:
a memory for use in a GNSS enabled device; and
a processor and/or circuit, coupled to the memory, for use in said GNSS enabled device, said processor and/or circuit being configured to:
receive location information of said GNSS enabled device from a plurality of different wireless resources;
determine a position fix for said GNSS enabled device utilizing said received location information from each of said plurality of different wireless resources in a pre-determined order according to a complexity of computing each of said position fixes;
select one of said computed position fixes as a current position of said GNSS enabled device; and
communicate said refined current position to a location-based server.

21. A method of processing signals, the method comprising:
in a GNSS enabled device:
receiving location information of said GNSS enabled device from a plurality of different wireless resources;
determining position fixes for said GNSS enabled device based on each of said plurality of different wireless resources utilizing said received location information;
determining a mean of said position fixes;
determining, based on said mean, a confidence level for each position fix for each of said plurality of different wireless resources; and
selecting a position fix with a highest confidence level as a current position of said GNSS enabled device.

22. The method according to claim 21, wherein said determining based on said mean comprises determining a difference between a position fix and said mean.

23. The method according to claim 22, wherein said determining based on said mean comprises normalizing said difference.

* * * * *